Feb. 21, 1967 W. R. MATTHEWS 3,305,432
MAKING OF CELLULOSE PULP
Filed July 15, 1963 9 Sheets-Sheet 8

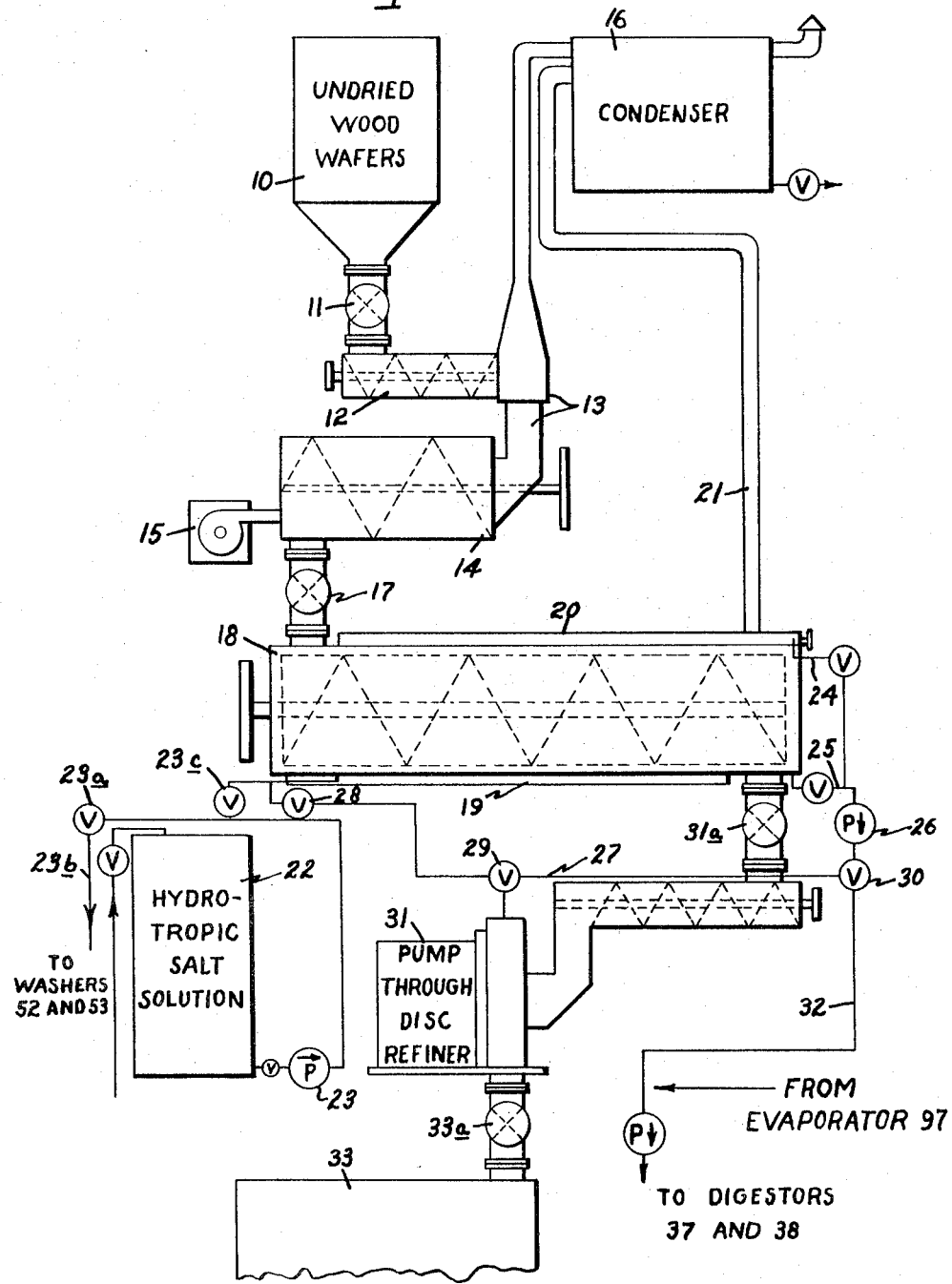

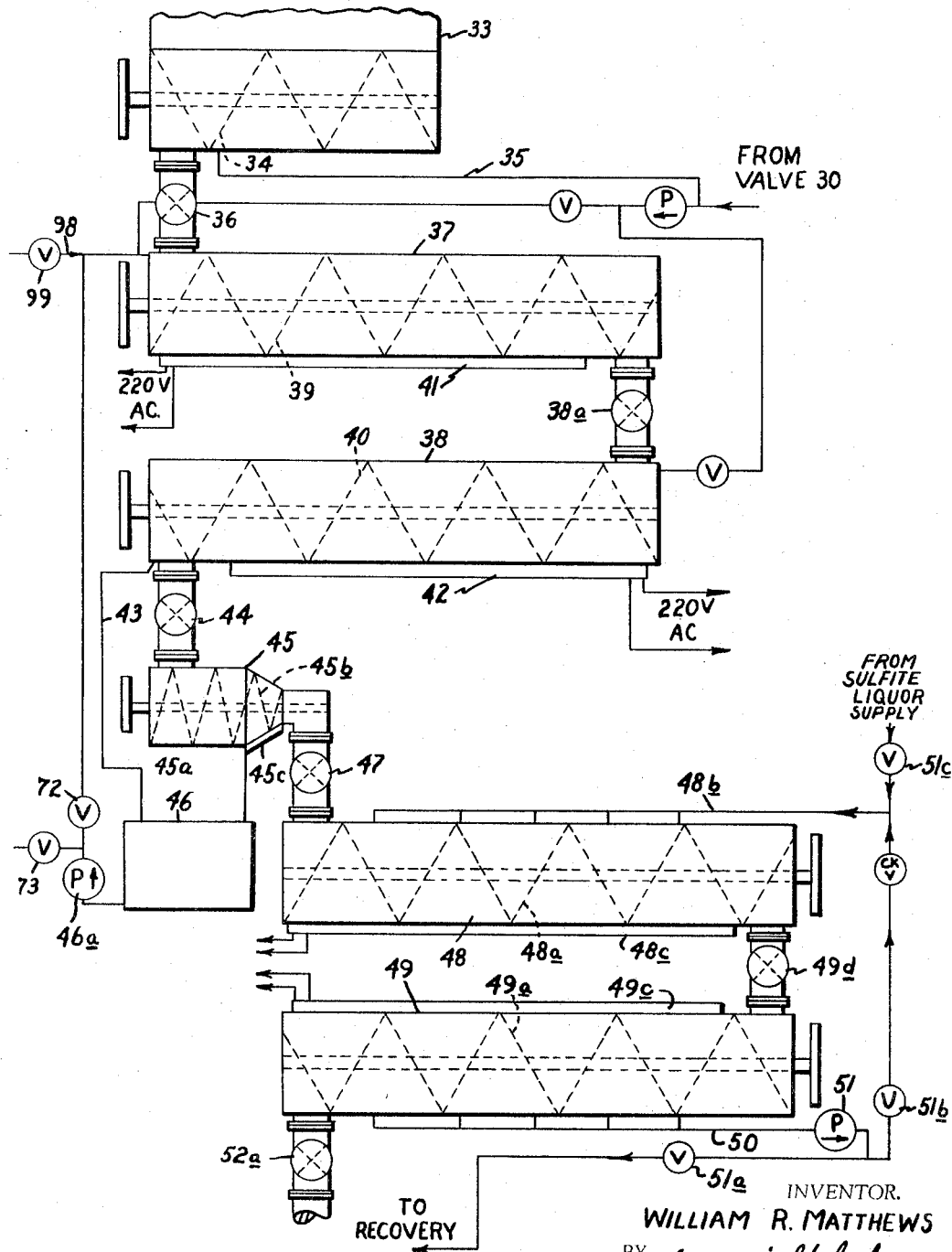

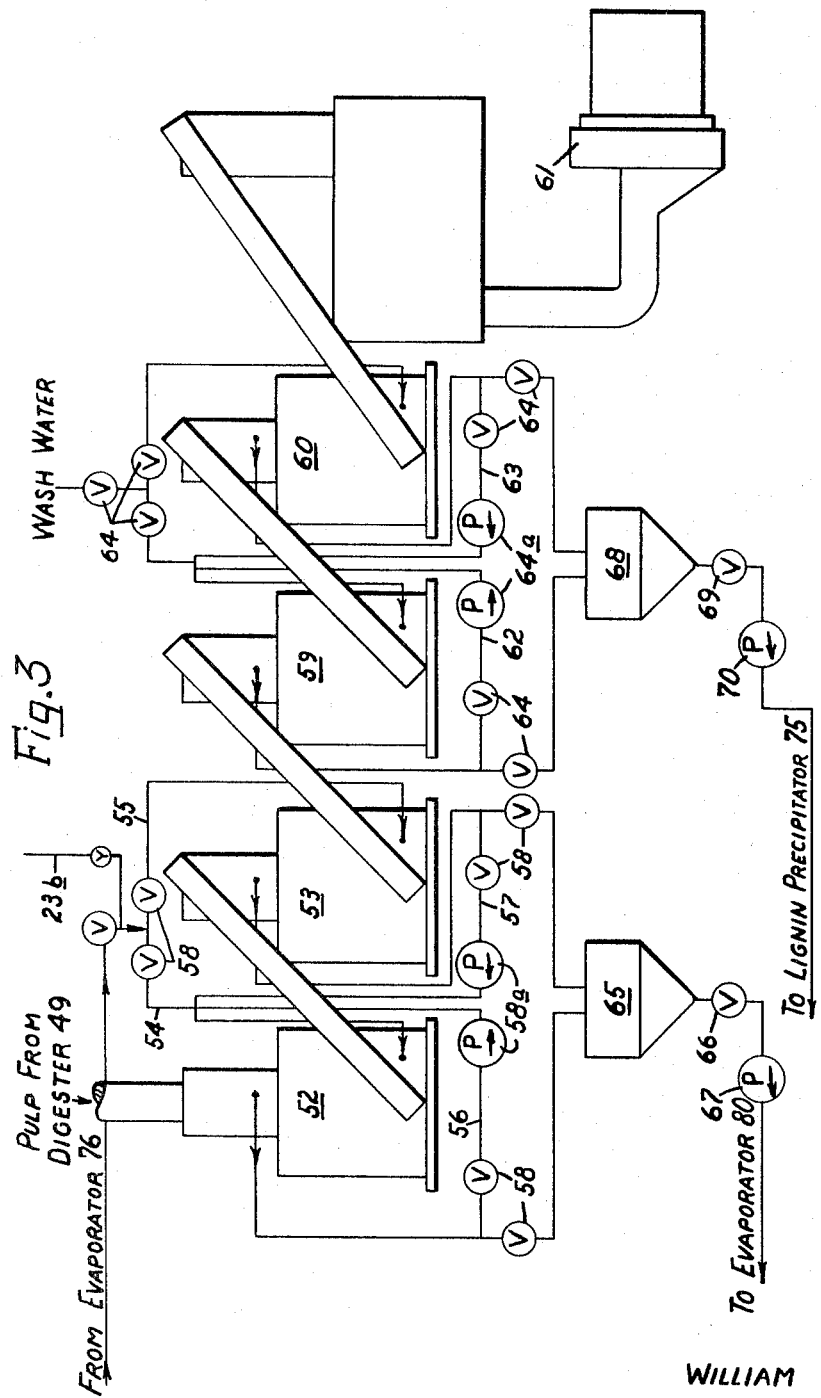

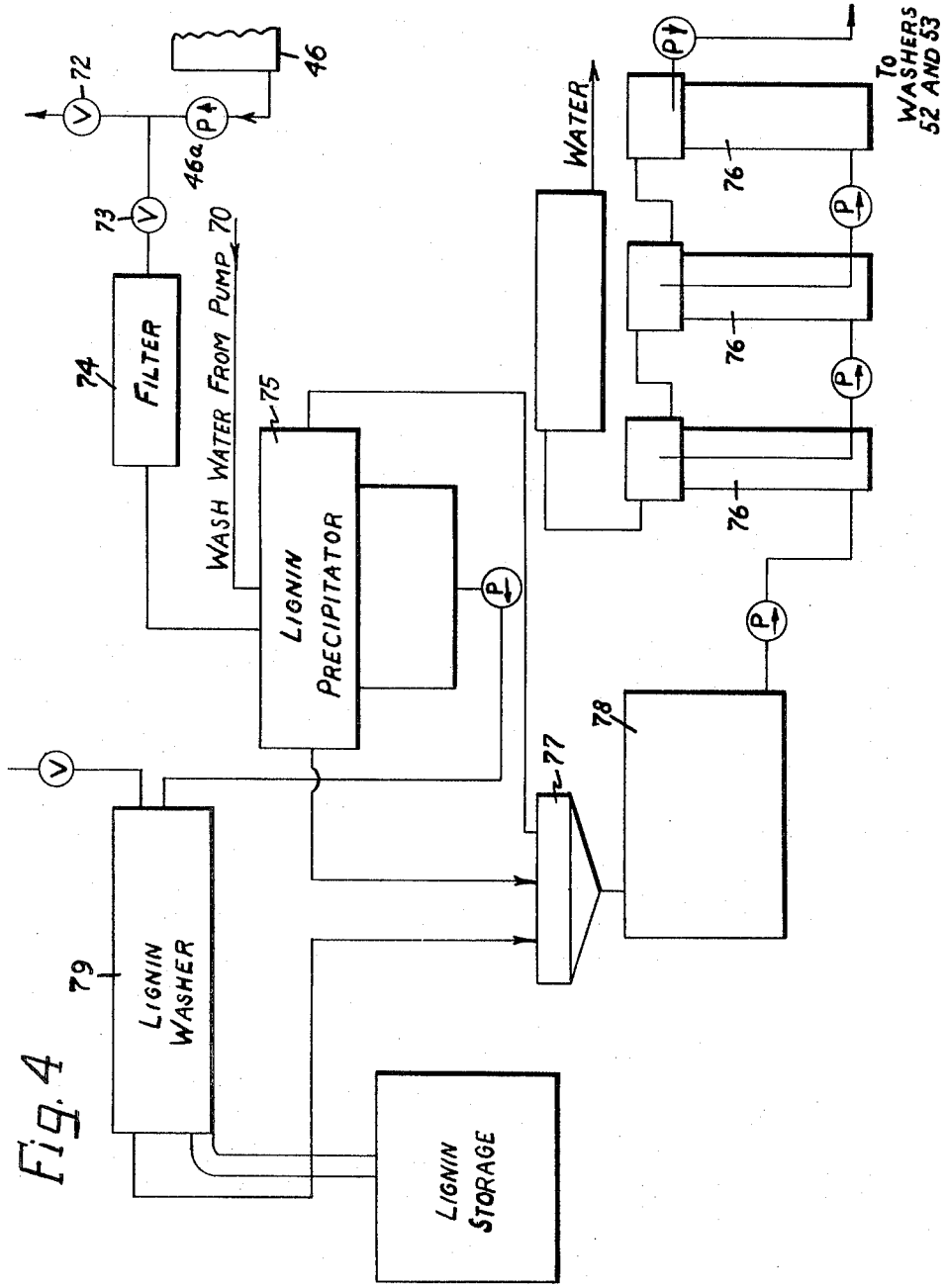

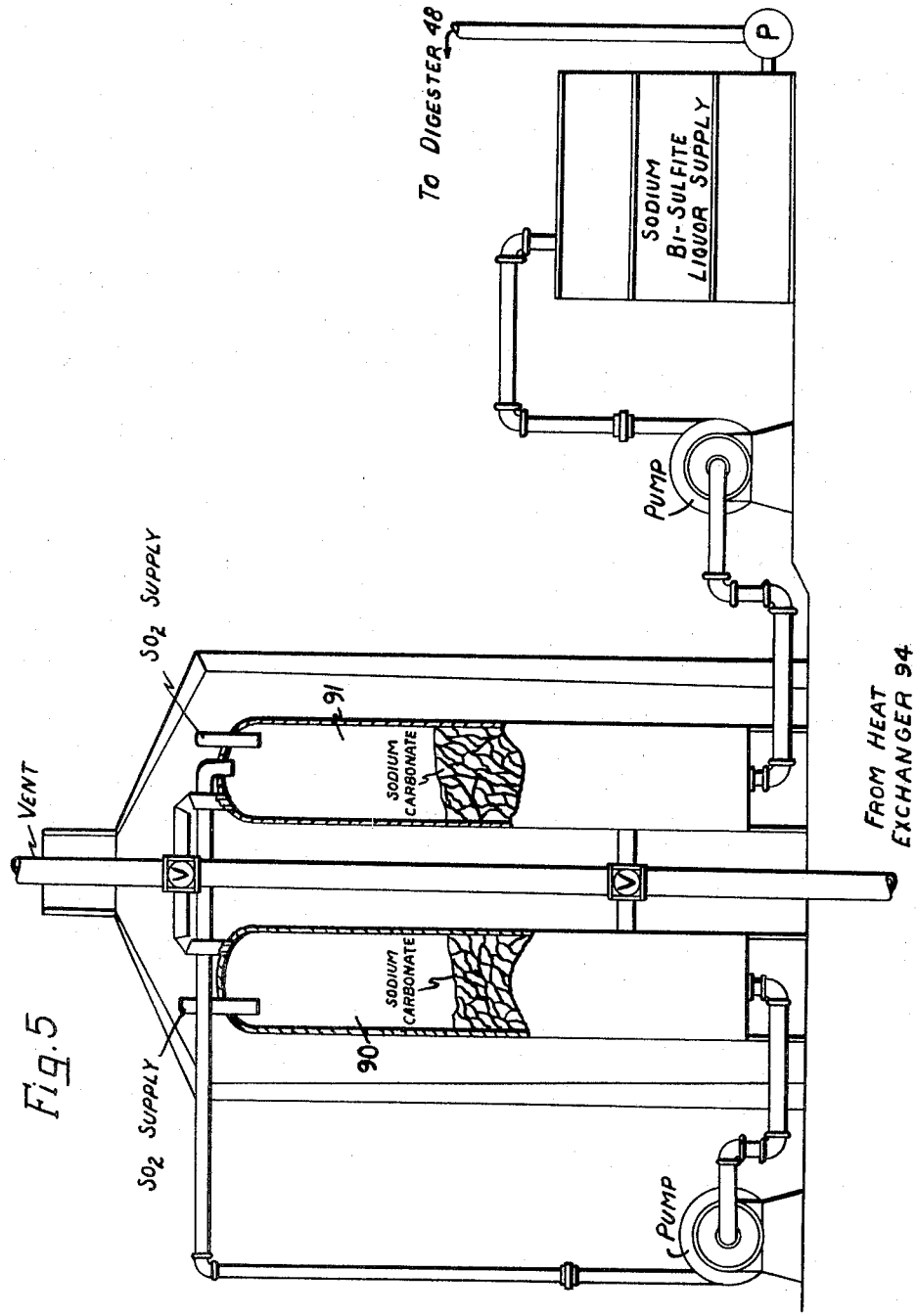

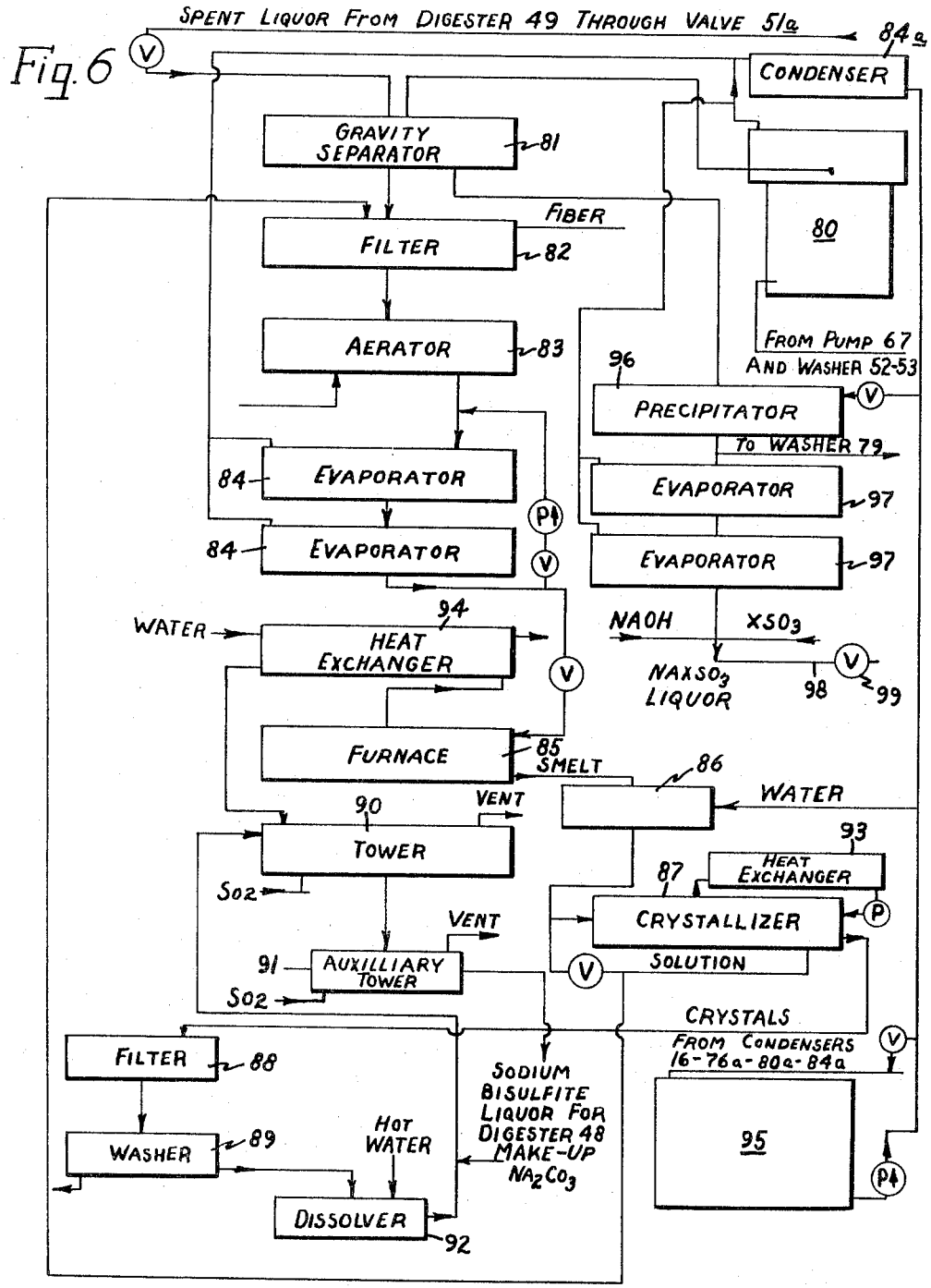

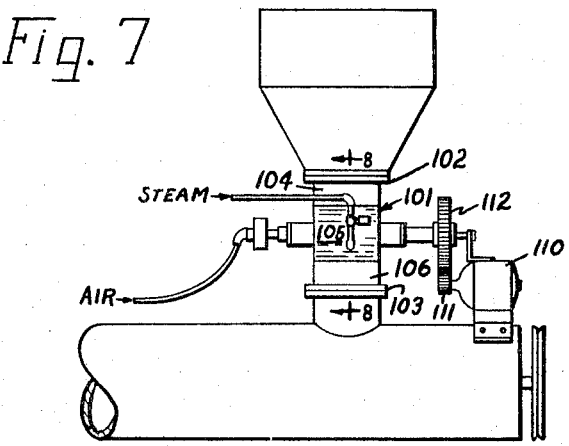
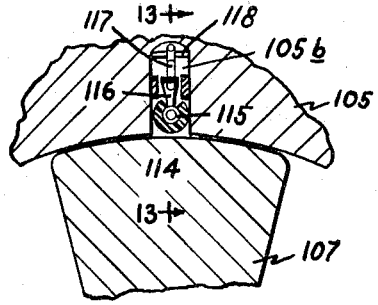
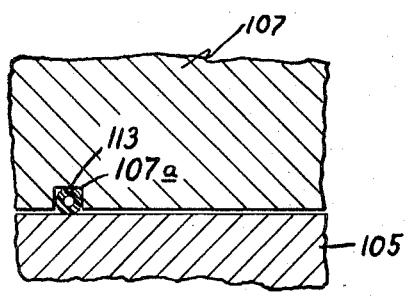
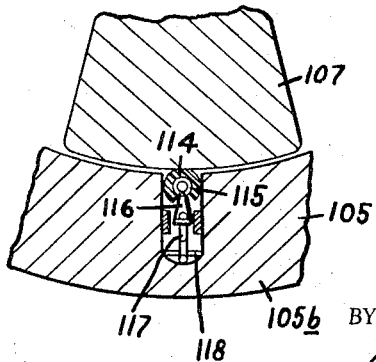

INVENTOR.
WILLIAM R. MATTHEWS
BY
*Wells & St John*
ATTYS.

INVENTOR.
WILLIAM R. MATTHEWS
BY
Wells & M John
ATTYS.

3,305,432
MAKING OF CELLULOSE PULP
William R. Matthews, W. 1022 7th Ave.,
Spokane, Wash. 99204
Filed July 15, 1963, Ser. No. 295,017
14 Claims. (Cl. 162—72)

The purpose of this invention is to treat natural lignin containing cellulose material such as wood, flax straw, wheat straw, jute, bagasse, etc. to separate the lignin from the cellulose and to recover both of them as separate products in a manner whereby each product so recovered suffers a minimum of chemical change and degradation and is in better condition for further use than has heretofore been commercially practical. While applicable to the various natural materials mentioned, my invention is directed primarily to the separation and recovery of lignin and cellulose from the wood of trees such as various pines, firs, spruce, hemlock and other evergeen species and such deciduous trees as maple, poplar, western larch and the like.

In the various woods it is well known that the lignin and the cellulose, the two major constituents of the wood, are found together in a cellular structure that does not lend itself to ready separation of these constituents. There are other constituents present which may also present problems. Examples are acetic acid and furfural, present in many woods, arabinose galactans, present in large quantities in the butt portions of western larch, resins and terpenes. However, in most woods the major constituents are cellulose, comprising up to 60% of the bone dry weight of the wood and lignin comprising up to 28% and more of the bone dry weight of the wood.

The wood pulping process has been primarily the separation of the lignin from the fibers of cellulose so that the cellulose fibers can be used for various products such as paper. The lignin has generally been a waste product. Often the liquid containing the lignin and the chemicals used to aid in the separation of the lignin from the cellulose has been subjected to evaporation to remove water and finally to burning to recover the pulping chemicals. One method of separating lignin from cellulose has been developed which does dissolve lignin from cellulose in such a way that the lignin may be precipitated out of the liquid. This method is generally referred to as the hydrotropic pulping process. This process has been known for many years. McKee Patent No. 2,308,564 describes one application of the process. An article by Edward F. Thode, Henry C. Crandall, and Norman S. Thompson in the September 1962 issue of the Journal of the Technical Association of the Pulp and Paper Industry, on pp. 232A–234A, compares the pulp obtained by the hydrotropic process with that obtained from various other pulping processes and discusses the development of the process. Their comparison indicates that the pulp from the hydrotropic process is inferior to that obtained by the kraft process and other similar processes. The fundamental characteristic of the hydrotropic pulping process appears to be that it dissolves lignin from the wood without chemical combination or interaction of the lignin with the hydrotrope. However, despite the apparent advantages of physical solution and recovery of the lignin over the chemical reaction phenomenon of the various sulphite and sulfate processes and the cold soda process, the pulp apparently retains too much lignin and this process has not been adopted to any appreciable extent in this country.

I have found that I can effectively pulp wood by combining the steps of hydrotropic pulping with other steps and gain the advantages of high yield and high quality pulp with recovery of most of the lignin as a useful solid and with a great reduction in the amount of water and air pollution when compared with chemical pulping. I have found that it is necessary, in order to most effectively dissolve the lignin, to subject the pieces or particles of the cellulosic material to a pre-drying and heating step by which the imbibed or "free" water is removed before the pieces are impregnated with a hydrotropic solution. This is important because the action of the solution is dependent upon maintenance of a certain concentration of the hydrotropic salt in water. The drying necessary will vary with the specie, but it should be carried out to the point where only the cell moisture remains. This is roughly 25% to 28% moisture content by weight. I find that by then impregnating the particles while they are hot (about 110 degrees C.) with an xylene based hydrotropic solution at a much lower temperature, 70 to 80 degrees C. the particles absorb the solution rapidly and they are carried along in the impregnator at about 90 degrees C. (below boiling). I find that the particles will absorb about three times their dry weight of the solution. A substantially saturated solution of sodium xylenesulfonate in water (40 grams salt to 60 grams water) is used. This combination of drying and impregnation has been found to reduce the pulping time. The impregnated wood is then fed while hot under pressure (about 25 p.s.i.) through a known "pump through" disc type refiner such as the Bauer Bros. Co. (Springfield, Ohio), No. 441 pump through refiner. This mechanically breaks up the particles into fiber bundles. The solution acts as a lubricant in the refiner. The refiner discharges into a surge bin from which the wood is next fed through a rotary valve to a continuous flow digester wherein the pressure is maintained at about 55 p.s.i. This digester is maintained at a temperature of the order of 140 degrees C. but at no more than 150 degrees C. The retention time in this digester is short. Depending upon the specie and temperature, it may vary between 15 minutes and one hour.

As the material leaves the digester it is subjected to pressing to remove as much solution as is practical. This solution may be recycled until its capacity to take lignin into solution is substantially used up. The lignin in solution is substantially unchanged chemically and, as is well known, it can be precipitated from the hydrotropic solution by reducing the hydrotropic salt content of the solution. The hydrotropic salt is not changed chemically so it is possible to filter and reconcentrate the solution for re-use.

The moist, hot, cellulose material with the part of the hydrotropic solution that cannot be pressed out, and with considerable lignin (up to 20% of the original lignin content), still with it either as undissolved lignin within the cell structure or in solution in the liquid that is not pressed out, has heretofore presented a difficult obstacle to the further treatment of the pulp. The lignin in the cell structure is difficult to remove and particularly by the hydrotropic solution because the cell structure still contains moisture and this tends to dilute the hydrotropic solution as well as to oppose its entry into the cell structure. Also there appears to be some chemical combination between the lignin and the other principal constituents of the wood (Sutermeister, Chemistry of Pulp and Paper Making, 34th edition, p. 168). Washing with water dilutes the hydrotropic solution and causes precipitation of lignin already in solution upon the wood fibers.

I have found that I can subject the already hot, wet pulp to a chemical pulping digestion with a solution that is compatible with the hydrotrope and thereby combine the remaining lignin with the chemical used and get a substantially complete removal of the remaining lignin with only short exposure of the cellulose to the chemical and with avoidance of high temperatures in the digester. The particular chemical used for pulping is preferably a sodium bi-sulfite solution made by reaction of sulfur dioxide and sodium hydroxide in solution. Other pulping chemicals that are compatible with the hydrotropic salt used are sodium based cooking liquors of the well known types used in present day pulping.

In carrying out the chemical cooking step I prefer to keep the temperature at all times below 150 degrees C. By using an acid sodium base pulping liquor (pH of the order of 1.85 to 2), at least 90% of the lignin remaining in the pulp can be chemically reacted and converted to a soluble ligno-sulfonic compound that can be washed from the cellulose. A variation from the acid sodium based pulping liquor is a neutral sodium sulfite liquor. This neutral liquor is a solution of sodium sulfite with sufficient buffering agent to keep the pH near 7.0–7.5 during cooking. Sodium bicarbonate is the preferred buffer, and the ratio of sodium sulfite to sodium bicarbonate should be about 4 to 1 for unbleached pulp and up to 7 to 1 for pulp that is to be bleached. These sulfite liquors are relatively specific for lignin at the temperatures and pH (acidity) used and give high yield pulps with high alpha cellulose content. However, the neutral pulping liquor will not remove as much of the lignin as the acid pulping liquor will in the same time.

The time of cooking necessary in this latter stage varies up to an hour or possibly longer, depending upon the temperature, the wood species and other factors. I prefer to initially contact the partially digested wood with the bisulfite liquor at the temperature of the partially digested wood, below 150 degrees C., after it is squeezed to remove the hydrotropic solution. If 80% or more of the lignin is dissolved by the hydrotropic pulping stage and if the partially digested wood is then pressed to remove 90% of the liquid present, the removed liquid will contain 72% of the original lignin content of the wood. If this original lignin content was 28 lbs. in 100 lbs. of wood the weight of lignin remaining in the wood would be less than 8 lbs. Part of this lignin is already in solution in the hydrotropic liquor that remains in the wood. The rest of the remaining lignin is found intermingled in the cell structure with the cellulose.

In this second digesting stage the undissolved lignin is chemically reacted with the pulping liquor. The resulting ligno-sulfonic compound formed by the reaction does not precipitate upon dilution like the unreacted lignin would if the pulp were washed to remove the hydrotropic solution. The sodium bisulfite liquor can better attack the lignin in the wood that was not dissolved by the hydrotropic solution because the major part of the lignin is already removed with the hydrotrope.

The liquor is drained from the wood in the final stage of pulping and the pulp is then washed to remove the pulping liquors and the soluble materials. It is to be noted that much of the so called "cell moisture" remains in the pulp. Whatever change takes place in this regard is due to heat.

All of the liquid cannot be drained from pulp. Whatever lignin that remains in hydrotropic solution will re-precipitate if the solution is diluted with water. Therefore I first wash the pulp with a saturated solution of the hydrotropic salt in water (about 40% salt by weight) at a temperature as near 90 degrees C. as practical. This washing does dissolve the exposed unreacted lignin in the pulp and removes it from the pulp so that when followed by a plain water wash the objectionable precipitation of lignin on the pulp by dilution of the hydrotropic solution below its capacity to retain lignin in solution is substantially avoided.

The sulfite liquor and ligno-sulfonic compounds are removed from the pulp by the washing. Most of the sulfite-liquor is removed by the concentrated hydrotropic solution wash and is then settled out of the concentrated hydrotropic solution. The separation of the sulfite liquor from the hydrotropic solution is aided by evaporation of some solution water before settling.

The washing is done in a plurality of stages and is preferably done in conventional screw press washers. From the washers the pulp is fed to another pump through disc type refiner, screened and further refined. The pulp is then ready for such further use or treatment as may be necessary to fit it to a particular use.

Part of (about ⅙) of the hydrotropic solution recovered from the wood leaving the hydrotropic solution digester is delivered to a precipitator where it is diluted with water to a hydrotropic salt content that is low enough to cause the lignin in solution to precipitate. The other part of the hydrotropic liquor is recirculated through the digester. The liquid is drawn through a filter from the precipitator and concentrated by evaporation to a point where it may be re-used to dissolve more lignin. The lignin is recovered as a solid from the precipitator. The spent sulfite liquor can be concentrated and burned or disposed of in a known manner by which such liquors are now disposed of. Since the sulfite liquor used by this process reacts with less than a fifth of the lignin it must react with in conventional sulfite pulping, disposal of the spent liquor is much less of a problem.

Referring now to the accompanying drawings wherein the essential parts of a pulping plant are illustrated diagrammatically with details of certain parts, I will describe in detail a preferred embodiment of my invention.

In the drawings:

FIGURE 1 is a diagrammatic view illustrating the equipment and connections embodied in the drying of the wood and impregnation thereof;

FIGURE 2 is a diagrammatic view illustrating the actual pulping operation after the wood is impregnated;

FIGURE 3 is a diagrammatic view illustrating the pulp washing and refining operation;

FIGURE 4 is a diagrammatic view illustrating the lignin precipitation and hydrotropic liquor recovery operation;

FIGURE 5 is a diagrammatic view illustrating the sulfite liquor preparation;

FIGURE 6 is a diagrammatic view showing the steps of reclaiming the solution and liquor from the pulping and washing steps;

FIGURE 7 is an enlarged fragmentary view showing the equipment used with the rotary valve to control passage of fibers and liquid through the system;

Figure 13:
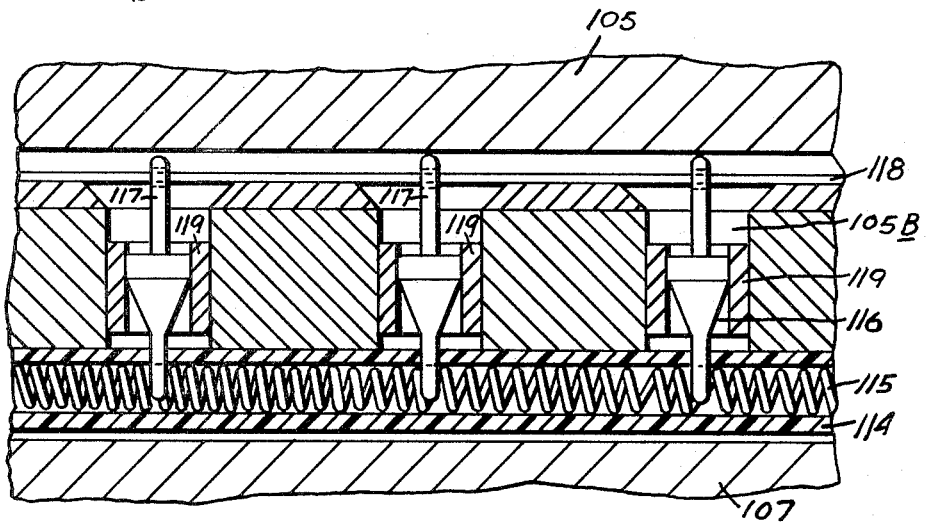
Figure 14:
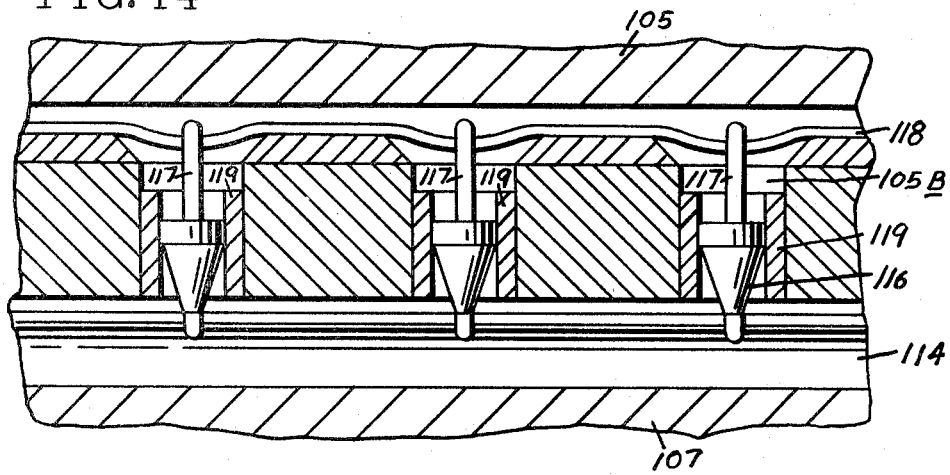

FIGURES 10, 11 and 12 are enlarged detail views showing the operation of the rotor seal for the rotary valve; and FIGURES 13 and 14 are enlarged detailed views on the line 13—13 of FIGURE 10.

Referring now to FIGURE 1 of the drawings, the raw wood particles are fed from a hopper 10 by a rotary valve 11 and a screw 12 into a vertical passage 13 where they drop into the inlet of a drier 14. Preferably the particles are wafers cut to uniform thickness, although chips or particles of the raw wood may be prepared in any desired manner. These particles usually contain a substantial amount of water. Pulp wood may contain 50% to 100% of water based on the bone dry weight of the wood. It is a well known fact that after the fibers take up all the moisture they can from water vapor they still will absorb up to 200% of the dry fiber weight if placed in contact with water in the liquid phase. This water absorbed in this way, I call imbibed moisture or water. It is desirable to remove this imbibed water in order to leave the wood in condition to take in the pulping liquor which is in the liquid phase and is water based. The percentage of moisture remaining at the fiber saturation point may vary from 23% to 30% of the bone dry wood weight. It is intended that this normal cell moisture shall remain after the initial drying step, although it will be appreciated that in removing the "imbibed water" some of this cell moisture may be extracted.

The drier 14 is shown as receiving hot dry air from a dry air heater 15. The air travels counter current to the wood particles and then up through the passage 13 to a condenser 16 where the moisture is condensed. The dried particles are fed through a motor driven rotary valve 17, described later herein, to an impregnator 18. The particular structure of this impregnator is described more fully in my copending patent application for Continuous Flow Wafer Impregnator and Digester Tube, Serial No. 295,025, filed July 15, 1963, and executed by me on the same date as this application. For the purposes of this application it may be described as a tube in which the particles are advanced lengthwise of the impregnator tube 18 while the impregnating solution is forced up through the particles. The tube 18 has an inlet chamber 19 along its lower side and an overflow chamber 20 along its upper side. A gas and vapor vent 21 is provided for the chamber 20 and it leads to the condenser 16. A supply of hydrotropic salt solution is stored in a tank 22 and pumped by a pump 23 to the inlet 19. The solution that overflows at the discharge end of the tube 18 is collected by the valve controlled outlets 24 and 25 and fed by a pump 26 to a return conduit 27 which has valves 28, 29 and 30 for directing the solution from the pump 26 to the inlet 19, or to the particles after they have left the tube 18 and are being mechanically broken up in disc refiner 31, or to a conduit 32 for withdrawal of surplus solution.

The wafers or chips from the drier 14 preferably are brought to the impregnator tube 18 at a temperature of about 100 degrees to 110 degrees C. and are contacted in the tube 18 by a cooler hydrotropic solution which I prefer to maintain at 70 degrees C. to 80 degrees C. I find that this method results in rapid impregnation of the wafers or chips without raising the temperature in the tube 18 high (above 100 degrees C.). Any gas or vapor in the chips can escape upward through the outlet chamber 20 and the vent 21. While other hydrotropic solvents may be used, for most pulping I prefer to use a solution of sodium xylenesulfonate in water. I use a saturated solution, i.e. about 40 parts sodium xylenesulfonate in 60 parts of water by weight. With this solution the cell moisture remaining in the wood particles will not dilute the hydrotropic solution enough to cause the lignin dissolved therein to precipitate. I find that the particles will absorb as much as three times their dry weight of solution.

Specifically the sodium xylenesulfonate is made by reacting caustic soda with 2,4-dimethylbenzene sulfonic acid. The chemical formula of the salt is $Na(CH_3)_2C_6H_3SO_4$. To control the pH of the solution the dimethylbenzene sulfonic acid is used. I prefer to maintain the solution at a pH of about 1.8 to 3.5, as I find that a larger proportion of the lignin can be removed from the wafers at this low pH than at higher pH levels.

The hydrotropic solution serves as a lubricant in the disc refiner 31. The disc refiner reduces the bundles of fibers and furthers the impregnation of the wood by the solution. The refiner discharges into a surge bin 33 through another motor driven rotary valve 33a. The surge bin has a screw feeder 34 at the bottom for removing the fibers and a solution removal conduit 35 to draw off any excess solution. The screw feeder 34 delivers the impregnated fibers through a rotary motor driven valve 36 to digester tubes 37 and 38 arranged in series and constructed with feed screws 39 and 40 to advance the fibers through them. These digester tubes have heaters 41 and 42 which may be electric heaters arranged as shown in my copending application identified above. The heaters are used to raise the temperature in the digesters to the desired level without introducing any diluting steam or other fluid.

Preferably the temperature in the digester tubes 37 and 38 is maintained at a level below 150 degrees C. This I find is a temperature low enough to avoid forming of objectionable odoriferous compounds and it is high enough to enable the digesting to be done in a short time. I have found that, at a temperature of about 140 degrees C., a cooking time in the digester of 30 minutes to 40 minutes is sufficient.

After passing through the digester tubes 37 and 38 the free hydrotropic solution is drained off while the fibers are leaving the tube 38 through a drain connection 43.

The fibers are then fed through a rotary valve 44 to a squeezing press 45. As shown, this press has a screw 45a which is provided with a tapered end portion 45b that compresses the fibers and expels the solution from them through a perforated shell 45c that surrounds the end portion. The expelled liquid is drained into a collecting tank 46 that also receives the solution from the drain connection 43. The press 45 may be of a known commercially available construction such as the "Pressafiner" No. 560 offered for sale by the Bauer Bros. Co. of Springfield, Ohio. Any other suitable press, such as the known "saucer" press may be used.

About 80% of the hydrotropic solution with its dissolved lignin is drained off by the drain connection 43 before the fibers are delivered to the press 45. The remaining solution in the fibers is carried with them into the press 45. Commercially available presses can readily remove 90% and more of the liquid in the fibers that will not drain off through the drain 43. Thus it is possible to take the fibers from the press 45 with less than 4% hydrotropic solution therein containing dissolved lignin. It is best not to compress the fibers too greatly in the press 45 because the fibers do contain some cell moisture that if squeezed out in the presence of too little hydrotropic solution, might dilute this solution below its critical lignin dissolving level which would cause reprecipitation of lignin in the fibers. Excessive pressing also tends to damage and weaken the fibers.

From the press 45 the fibers are next taken to a chemical digesting unit for reacting the remaining undissolved lignin with a sulfite liquor. This chemical digesting unit comprises digesting tubes 48 and 49 that are connected in tandem. The tubes 48 and 49 are provided with screws 48a and 49a to advance the fibers. The liquor inlet connection for the digester 48 is identified by 48b. The heaters for the digesters 48 and 49 are identified by 48c and 49c. The digester 49 has a drain conduit 50 leading to a pump 51 which delivers the excess liquor to a recovery unit or recirculates it. The valves 51a, 51b and 51c provide the control for recirculating the sulfite liquor as desired. Another rotary valve 47 is interposed between the press 45 and the tube 48 so that if desired, the chemical digesting in the tubes 48 and 49 may be carried out at a higher pressure than that existing at the outlet of the press 45 without any feed back of chemical solution to the hydrotropic solution being removed at the press 45. The digester tubes 48 and 49 are essentially like the digeter tubes 37 and 38 including heaters 48c and 49c to supply additional heat to aid in the digesting. However, I prefer that the temperature in these tubes be kept below 150 degrees C. in order to avoid formation of objectionable odoriferous compounds.

A suitable chemical solution for use in the digesters 48 and 49 is a sodium bisulfite solution. For these digesters I may use sodium based acid sulfite having a pH of 1.5 to 6.5 or so-called neutral sulfite (pH 6.5 to 8.5) or alkaline sulfides such as are used in the kraft process. I prefer, however, to use the sodium bisulfite solution described hereinafter, the production of which is illustrated in the sulfiting tower of FIGURE 5.

Digestion of the fibers in the chemical solution causes a chemical combination of undissolved lignin remaining in the fibers with the sulfur containing liquor to form ligno-sulfonates. However, since most of the lignin is already dissolved out by the hydrotropic solution and removed before the fibers enter the chemical digesters, I need only a small amount of the sulfur containing chemicals for this phase of the lignin removal. The hydrotropic solution should be nearly saturated so that what is left in pulp going to the bi-sulfide digester will not be diluted by the bi-sulfite solution added to the point of precipitation of the lignin when they mix. Since the lignin is not changed chemically in the hydrotropic solution, it can be readily dissolved in the bi-sulfite solution where it will be changed chemically to ligno-sulfonates. This does have the effect of robbing the hydrotrope of lignin and leaving it nearer its original condition. There is another factor present in the merged liquors. That is the relative solubility between xylene sulfurous acid and sulfur dioxide in water. The base of both the hydrotropic solution and that of the bi-sulfite solution is sodium hydroxide dissolved in water. The solubility of $SO_2$ in water is much greater than that of $XSO_3$ and $SO_2$ cannot be reacted with xylene at temperatures and pressures present in the digester. The temperature in the digester is below the boiling point of xylene. It is believed that when the hydrotropic solution and the bi-sulfite solution are merged that the sulfur content (available as NaS) will be increased and the pH lowered somewhat. This would have the effect of speeding the dissolving of the remaining lignin as this is the effect of lowering the pH (increasing acidity). It is not difficult to dissolve 90% of the lignin in the hydrotropic digestion stages. Thus only 10% at most of the original lignin need be chemically combined with the sulfite or like digesting liquid. Therefore I use only about one-eighth or less of the chemicals that would be used for complete digesting by means of the sulfite method. There is a small amount of hydrotropic solution (4% or less of the fiber weight) remaining in the fibers and this solution contains dissolved lignin.

The liquor is drained from the pulp at the outlet from the digester tube 49 and sent to a separator to be described later. About 80% of the liquor can be readily drained off. It is then necessary to wash the pulp to remove the ligno-sulfonates and spent sulfite liquor. There is still some hydrotropic solution with lignin in solution remaining in the pulp which, if diluted with water, would re-precipitate the lignin on the fibers. In order to prevent this re-precipitation I first wash the pulp with saturated (40%) hydrotropic solution. A concentration like that used for initial impregnation is used for this washing. It removes the dissolved lignin quite thoroughly in two stages of washing illustrated in FIGURE 3 where the washers 52 and 53 are shown as having supply lines 54 and 55 for the hydrotropic solution with suitable recirculation connections 56 and 57, and valves 58 and pumps 58a for controlling the solution flow. This washing operation also substantially removes the chemical digesting liquor with its ligno-sulfonate compounds. In the last two washers 59 and 60 plain wash water is used to complete removal of the hydrotropic salt solution that is not fully drained out after the pulp leaves the washers 52 and 53. Suitable recirculation connections 62 and 63 are provided for the washers 59 and 60 with control valves 64 and pumps 64a. The effluent from the washers 52 and 53 goes to a collector vessel 65 from which the effluent is removed through a valve 66 by a pump 67. The effluent from the washers 59 and 60 goes to a vessel 68 from which it is removed through a valve 69 by a pump 70

The pulp from the washer 60 is substantially free of lignin. It can be refined further in a disc refiner 61, screened to remove fines and then dried by conventional means. The effluents from the washers 52, 53, 59 and 60 and those from the digesters are subjected to recovery steps to reclaim the hydrotropic salt solution, to collect the lignin from it, and to separate the ligno-sulfonate containing liquor from the hydrotropic salt solution. This reclaiming and recovery system enable me to overcome most of the pollution problems that presently exist in the pulp mill.

Referring now to FIGURE 4, the recovery steps will be described. The important recovery step lies in the removal of the lignin from the hydrotropic salt solution that has been used in the hydrotropic digesters 37 and 38 and in the impregnator 18. This solution can be recycled several times (4 to 7 times depending upon discoloration and foreign matter picked up from the chips) before it is drawn off for separation of the constituents. The liquid from the tank 46 is pumped by a pump 46a up to the inlet end of the digester 37. Any additional liquid needed in the digesters 37 and 38 is taken off at the valve 30 (FIGURE 1). The pump 46a has valves 72 and 73 to control the direction in which the solution may go from it. The solution that is being taken to the recovery apparatus goes through the valve 73. The recirculated solution goes through the valve 72

The solution goes from the valve 73 through a filter 74 to remove any filterable solid material and then to a precipitator tank 75 where it is diluted with water at a temperature of 60 to 70 degrees C. until the salt is about 8% by weight of the solution. This dilution causes the solution to give up its lignin as a precipitate. Precipitation of lignin from the hydrotropic solution is best at 60 degrees to 70 degrees C. Thus, if the hydrotropic solution is at 90 degrees C., the water used to dilute it can be at 50 degrees C. The dilute solution from the precipitator is sent to an evaporator 76 through a collector 77 and a storage tank 78. In the evaporator 76 it is concentrated to the point where it can be used again to dissolve lignin. This reconcentrated solution of the hydrotropic salt is suitable as a wash liquid for the washers 52 and 53 and this process of pulping takes advantage of this fact.

Referring to FIGURE 1, whatever additional make-up solution is needed is supplied from the tank 22 through the pump 23 and a valve 23a in the supply conduit 23b. The valve 23a and a valve 23c in the line from the pump 23 to the inlet manifold 19 of the impregnator can be used together to supply new hydrotropic solutions direct to either the impregnator 18 or to the washers 52 and 53. Thus make-up or a complete supply of the concentrated hydrotropic solution is available to the impregnator and to the washers at all times.

The precipitated lignin may be washed to remove any traces of the hydrotropic salt in a washer 79, and then dried in any suitable drier (not shown). On the average there is about 25 to 28% by weight of lignin in the pulp-woods, according to the Institute of Paper Chemistry, "Pulp Woods of U.S. & Canada." Thus for every ton of wood, if good recovery of lignin is obtained, one should have 450 lbs. to 500 lbs. of lignin as a byproduct. It is a fuel of considerable value. It may be used for other purposes.

The spent liquor from the digesters 48 and 49, and the effluent from the washers 52 and 53 contain both hydrotropic salt solution with dissolved lignin and sulfite solutions containing ligno-sulfonates. It is essential to recover as much of these materials as possible both from the economic standpoint and the pollution standpoint. While the amount of sulfur-chemicals needed in pulping by my invention is only a fraction of what is used in conventional sulfite or kraft pulping processes, it is nevertheless desirable that they be recovered or at least treated in such a manner that the water pollution aspect can be avoided.

I find that the hydrotropic salt solution with its dissolved lignin, can be separated from the ligno-sulfonate containing spent liquor by a rather simple method. The two liquors do not appear to affect each other in the digestion phase in the digesters 48 and 49. When they later are to be separated, I take advantage of the marked difference in specific gravity of the two to separate them. The hydrotropic solution is much heavier than the sulfite liquor. I first subject part of the wash liquid (20%) from the washers 52 and 53 to an evaporation in an evaporator 80 (FIGURE 6) to concentrate it and to avoid reaching a lignin precipitating level of concentration of the hydrotropic solution if this is diluted by water from bi-sulfite solution or wood moisture. This step is not always necessary. The two effluents (drain from the digester 49, and effluent from the washers 52–53) are then put through a specific gravity separation 81. This may be a settling tank or a centrifuge. Here the much higher specific gravity of the concentrated sodium xylene solution, when compared with the sodium bi-sulfite solution results in a separation. The lighter materials (fibers, etc.) stay with the sodium bi-sulfite. However, the relatively insoluble calcium carbonate found in the wood and washed out in the digesting and washing will go with the sodium xylene sulfonate solution and will settle from this solution.

The light liquor is then filtered by a filter 82 to collect the loose fibers which may be burned or screened to recover any useable fibers.

The filtered liquor is next aerated thoroughly in an aerator 83 to convert the sodium compounds therein to sodium thiosulfate and sodium polythionates. The sulfur in the liquor is not volatilized so there is no odor from this process. The sodium compounds resulting are not corrosive. The liquor can now be concentrated by evaporation in mild steel natural circulation evaporators 84 to recover most of the water. When the liquor has been concentrated by evaporation to about 65% solids, it is fed to a furnace 85.

In the furnace the liquor is burned leaving a residue or "smelt" containing sodium carbonate and sodium sulfide, plus small quantities of sodium sulfate. These chemicals can be recovered by known processes. However, as a part of the present pulping process I prefer to treat the smelt in the manner described below.

The smelt is dissolved in water in a tank 86 and the sodium carbonate is crystallized by cooling in a crystallizer 87 as sodium carbonate monohydrate. The crystal solids are collected by filtering in a filter 88 and washed in a washer 89. They are used in the making of the sodium bi-sulfite liquor as will be explained later.

The sodium sulfide-sodium sulfate solution from the crystallizer 87 and the washer 89 is recycled through the filter 82 and the aerator 83.

The furnace flue gases are cooled to about room temperature by use of a heat exchanger and water and then fed to the sulfiting tower of FIGURE 5, indicated in the flow diagram by the numeral 90. In the sulfiting tower there is initially a solution of sodium hydroxide in water at a concentration of about one pound NaOH to six pounds water. The furnace gas is mostly sulfur dioxide and carbon dioxide. The sulfur dioxide is absorbed in part and in part reacts with the sodium hydroxide to provide sodium sulfite and sodium bi-sulfite. The sodium carbonate monohydrate is redissolved by adding hot water and is added to the solution in the tower 90. It acts as a buffer and reacts with any excess wood acids that remain in the pulp when it is subjected to the sulfite liquor. Then the solution in the tower 90 is drawn into an auxiliary tower 91 where additional sulfur dioxide is added to form the sodium bi-sulfite solution used in the digesters 48 and 49. By further reacting the sodium bi-sulfite solution with more of the sodium carbonate solution a neutral sodium sulfite solution can be produced.

In the flow sheet I have shown a dissolving tank 92 where the sodium carbonate crystals are re-dissolved. I have also indicated a heat exchanger 93 in connection with the crystallizer and another heat exchanger 94 for the furnace gases. The water vapor from the evaporators 84 is condensed in a condenser 84a and used in dissolving the smelt in the tank at 86. Make up water, as needed for this and for the dissolving of the crystallized sodium carbonate in the tank 92 is obtained from a supply tank 95 into which the several condensers 16, 76a, 80a, 84a, etc. deliver the water they collect.

The hydrotropic solution and any calcium carbonate from the wood are also separated by the separator 81. The hydrotropic solution goes to a precipitator 96 where water is added to precipitate the lignin therein. This lignin is delivered to the lignin washer 79 and added to the lignin from the precipitator 75. The solution is then concentrated by evaporators 97 and reused. Sodium hydroxide and xylene sulfonic acid are added as needed to correct the pH and the resulting solution is recycled through a conduit 98 and a valve 99 to the hydrotropic digester 37 (FIG. 2).

A brief description of the rotary valves used follows. Referring to FIGURES 1 and 2, these figures show rotary valves at 11, 17, 31a, 33a, 44, 36, 38a, 47, 49d and 52a controlling the flow of particles from the supply hopper 10 through the several units 14, 18, 31, 33, 37, 38, 48, and 49 to the washer 52. The details of such valves are shown in FIGURES 7–14 inclusive.

Each valve unit includes a casing 101 with flanges 102 and 103 for connection in the particle flow line. Between the flanges there is an inlet section 104, a valve cylinder section 105 and a discharge section 106 of the casing 101. Within the cylinder section 105 there is a four bladed valve 107 fixed on a tubular shaft 108. Within the shaft 108 there is a non-rotating ported sleeve 109. A stepping motor 110 drives the shaft 108 through a gear drive 111–112. The motor is driven intermittently to turn the shaft 108 and valve 107 a quarter turn (90 degrees) each time and to bring the blades to a stop after each 90 degree turn.

Figure 8:
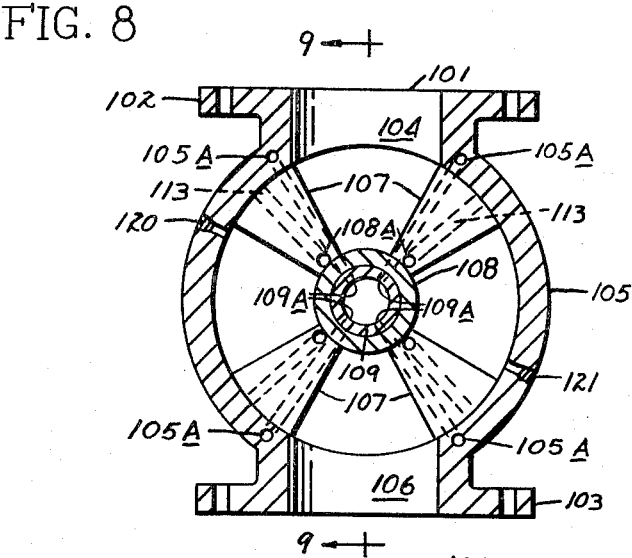
FIGURE 8 is an enlarged sectional view on the line 8—8 of FIGURE 7.
Figure 8A:
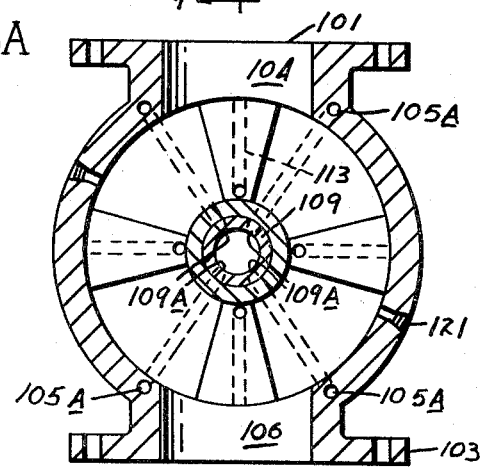
FIGURE 8A is a view like FIGURE 8 showing a changed position.
Figure 9:
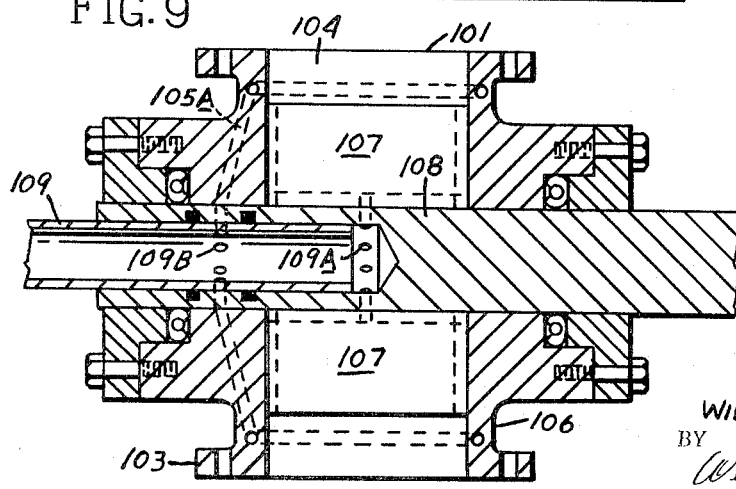
FIGURE 9 is a sectional view on the line 9—9 of FIGURE 8.

The ports 109a of sleeve 109 align with apertures 108a in the shaft 108 when the shaft is stopped in the position shown in FIGURE 8. In the end of each blade of the valves 107 there are channels 107a (FIG. 11) in which there is a resilient tube 113 of low friction material that is sealed at its inner end to the shaft 108 and communicates with the port 109a through the aperture 108a. Thus whenever fluid pressure is applied through the sleeve 109 and its ports 109a the tube 113 is expanded. The tubes 113 are sealed at their outer ends.

The blades of the valve 107 are sealed when stationary to prevent flow of fluid between their peripheral faces and the inner surface of the cylinder section 105 by seal members 114 of a yieldable material such as the material sold under the trademark "Teflon" with coiled springs 115 inside them. These members 114 are located, as shown by FIGURES 8, 10, 11, and 12 in recesses 105b in the section 105. The coiled springs 115 are connected to lifters 116 that act to keep the seal members 114 retracted from the path of the blades of the valve 107 while the valve is moving from one fill and discharge position to the next. When the valve 107 is stopped the ports 109b of the sleeve 109 are aligned with apertures 108b in the shaft 108 and with the passages 105b in the section 105. The fluid pressure within the sleeve 109 is thus applied to the interior of the members 114 to press them against the rotors of the valve 107 in opposition to the force of the lifters 116. The lifters 116 have loop springs 117 that are secured in the passages 105b by cross pins 118. Guides 119 in the passages 105b guide the lifters in their limited movement.

The section 105 has a vent port 120 to vent off gas pressure. It also has a steam inlet port 121 positioned to supply steam to purge the pockets between rotors when the space is open to the discharge section 106 of the valve casing 101.

The valve just described provides an effective means for transferring the chips and liquid between the several units of the pulping apparatus. Any suitable valve capable of carrying out this function may be used. A known commercial valve that is available is the valve sold by Bauer Bros. Co. of Springfield, Ohio, as the Grenco rotary valve.

The following is a specific example of my improved process as applied to certain woods. The process was carried out in six different batches or cooks as follows:

Cook #1—Red fir wafers
Cook #2—White pine wafers
Cook #3—Extracted western larch chips
Cook #4—White fir wafers
Cook #5—Extracted western larch wafers
Cook #6—Ponderosa pine wafers The wafers were generally more uniform in thickness than chips cut by the more common method of end cutting. The western larch is known to have a high arabogalactan content and the chips and wafers from western larch were first treated in a known manner to extract this material.

The cook #1 was made with a fresh 30% solution of sodium xylene sulfonate with water (30 lbs. sodium xylene sulfonate, 70 lbs. water). The solution was mixed with the dried chips for impregnation and then the temperature was raised to 140 degrees C. and held at that temperature for two hours. The solution was then drained from the chips and used, with fresh make up solution for cook #2. The pH of the solution was measured at 3.5 before the first cook and dropped slightly. Before mixing with the white pine wafers of cook #2 the pH was raised to 3.5 by adding sodium hydroxide.

After cooking the white pine wafers the solution was again drained and squeezed from the wafers. It was found now to have a pH above 3.5 and it was adjusted to 3.5 by adding dimethylbenzene sulfonic acid. Make up fresh solution was added to bring the volume of solution up to the original volume. This procedure was continued until all six batches of particles had been subjected to the digesting in the hydrotropic solution. It was found that the solution had gradually been diluted as the several cooks were made. The solution at the end was only approximately 19% of sodium xylene sulfonate.

Using the established values of the content of lignin in the various species treated the results in terms of lignin removal are set out below:

The particularly high lignin content left in the two extracted larch batches was due to something in the extraction process which apparently made the lignin less soluble in the hydrotropic solution. There seemed to be no substantial loss in effectiveness of the hydrotropic solution even after four re-uses for the extraction was very good in the Ponderosa batch No. 6.

Following the hydrotropic solution removal the solution removed was diluted with water and then allowed to stand with the result that the lignin therein precipitated and the solution could then be drawn off and it was. The lignin was washed with water and dried.

Some of the fibers remaining after squeezing out the hydrotropic solution were treated with sodium bi-sulfite liquor with 2% free and 2% combined sulfur dioxide, the liquid being injected at 95 degrees C. and the temperature then raised to about 145 degrees. (Actually in certain tests the temperature was raised to 180 degrees C. in 50 minutes. This was found too high to avoid noxious odors.) Only a brief time (15 min. at 180 degrees C. and 40 min. at 145 degrees C.) was necessary to complete the cook. The liquor was then drained off.

The sodium bi-sulfite liquor digest was started at pH 3.5 and rose slightly in all instances during the cook.

Following the sodium bi-sulfite digesting, the fibers were washed first with hydrotropic salt solution (40% solution of sodium xylene sulfonate in water) to remove the ligno-sulfonates and any free lignin not reacted with the sodium bi-sulfite liquor. This mixed solution was separated by settling after concentrating it in an evaporator. The concentrated hydrotropic solution being much heavier than the sodium bi-sulfite liquor is easily recovered. The pulp was then washed with water to remove the liquors and finished in a conventional manner.

Some of the product from the hydrotropic salt solution digesting alone was tested with the following results:

| Cook No. | Species | Canadian Freeness | Tear | M.I.T. Fold | Breaking length, meters |
|---|---|---|---|---|---|
| 1 | Red Fir | 740 | 55 | 0 | 662 |
| 2 | White Pine | 700 | 181 | 15 | 2,465 |
| 3 | Larch Ex | 785 | 17 | 0 | 125 |
| 4 | White Fir | 350 | 190 | 23 | 3,206 |
| 5 | Larch Ex | 620 | 21 | 0 | 125 |
| 6 | Ponderosa | 750 | 99 | 1 | 927 |

The pulp following digesting with the hydrotropic solution and digesting with the bi-sulfite liquor was found to be quite free of lignin. Not all of the six cooks were subjected to both types of pulping but cooks Nos. 1, 2, 3 and 4 are found to have a lignin content of less than 2% and are much improved in the other factors over the products subjected to hydrotropic pulping alone as shown by the following:

| Cook No. | Species | Canadian Freeness | Final lignin, percent | Tear | M.I.T. | Breaking length, meters |
|---|---|---|---|---|---|---|
| 1 | Red Fir | 725 | .2 | 201 | 362 | 6,896 |
| 2 | White Pine | 725 | .5 | 186 | 842 | 6,584 |
| 3 | Larch Ex | 785 | 1.0 | 213 | 62 | 2,861 |
| 4 | White Fir | 740 | .15 | 237 | 143 | 3,275 |

| Cook No. | Lignin originally in particles of wood, percent | Lignin in particles after hydrotropic solution removed, percent | Species | Yield, percent |
|---|---|---|---|---|
| 1 | 26.8 | 2.8 | Red Fir | 76. |
| 2 | 26.4 | 6.9 | White Pine | 80.5 |
| 3 | ¹ 26.8 | 10.5 | Ex. Larch | 71.1 |
| 4 | 27.4 | 7.9 | White Fir | 80.5 |
| 5 | ¹ 26.8 | 11.1 | Ex. Larch | 71.7 |
| 6 | 26.7 | 2.8 | Ponderosa | 76.1 |

¹ Water sol. 12.6%.

It is believed to be evident from the foregoing description that I have provided a method of making pulp wherein the removal of the lignin from wood is accomplished in a simple and effective manner that saves both the cellulose and the lignin for further use. The method also conserves the materials used to extract the lignin from the wood and does so in such a manner as to substantially avoid pollution of streams or air in the vicinity of the extraction. Furthermore, by the reduction in the amounts of chemicals reacted with the wood products a substantial saving in costs of producing pulp is made.

I am aware that all woods contain substances other than lignin, which are removed with the spent pulping liquors, or must be removed before pulping. In regard to those substances that are present in pines, Douglas fir and western larch, these are removed from the wafers or chips before the drying step that is the beginning of my process. There are known ways to remove such substances (Casey, Pulp & Paper, p. 184). Furfural and acetic acid are formed in the pulping process. These substances are in the vent gases from the hydrotropic digester and are found in the hydrotropic solution from the digester 38. They are recovered from the solution gases by condensation. Furfural volatilizes in steam. Acetic acid distills out at 100 degrees C. to 120 degrees C. After removal from the hydrotropic solution gases the furfural and acetic acid may be separated and recovered.

The necessary steps for good pulping involve drying to remove imbibed moisture when it is present, impregnating and digesting the cellulosic particles at a temperature in the range of 90 degrees C. to 155 degrees C. with a substantially saturated hydrotropic solvent (preferably sodium xylene sulfonate in water but other hydrotropic solvents such as those mentioned in the McKee Patent No. 2,308,564 are usable), mechanically removing the solvent from the particles to where the solvent comprises less than 20% of the total weight of remaining fiber and liquid, then subjecting the particles to digestion by a sulfur containing pulping liquor (acid, neutral or alkaline but preferably acid) that is compatible with the hydrotropic salt solution at a temperature preferably below about 155 degrees C., then removing the free sulfur containing liquor from the fibers, then washing the fibers with the substantially saturated hydrotropic salt solution and draining it from the fibers and finally washing the fibers with water. By following these steps it is possible to obtain a high yield of excellent pulp, to recover most of the lignin as a usable product, and to recover and re-use most of the hydrotropic salt solution and most of hydrotropic salt solution and most of the water. When it is not important to avoid creation of noxious odors the temperatures in the digesters may be raised. This speeds up the digestion particularly in the digestion with the sulfur containing solution. It is obvious that even if the sulfite liquors are not reclaimed the quantities necessary are greatly reduced in comparison with a pulping operation where the entire lignin removal is by the chemical combining of the lignin with the sulfur containing liquor. The advantages from the standpoint of avoiding pollution problems and water supply problems appear obvious.

Having described my invention, I claim:

1. The method of making pulp from natural cellulosic material such as wood, which comprises the steps of:
   first removing the imbibed moisture from said particles;
   soaking the particles in a concentrated hydrotropic salt solution;
   draining and squeezing the solution from the particles;
   then soaking the particles in a pulping liquor selected from the group of pulping solutions comprising acid sulfite solutions, neutral sulfite solutions and alkaline sulfide solutions;
   draining the liquid from the particles;
   washing the particles with the concentrated hydrotropic salt solution; and
   removing the last named solution by washing the particles with water.

2. The method of pulping lignin containing particles of natural cellulosic material such as wood particles to recover the lignin and cellulose separately therefrom which comprises the steps of:
   subjecting the particles substantially free of imbibed moisture to impregnation and digestion in a substantially saturated hydrotropic solvent;
   mechanically removing the solvent from the particles to a point where the solvent remaining in the particles is less than 20% of the total weight of the remaining fiber and liquid;
   reacting the remaining fiber and liquid mass with a sulfur containing pulping liquor selected from the group of pulping solutions comprising acid sulfite solutions, neutral sulfite solutions and alkaline sulfide solutions;
   draining off the liquid resulting from the reaction;
   washing the remaining fiber and liquid mass with a substantially saturated hydrotropic solvent and draining it from the fibers; and
   washing the remaining fiber and liquid mass with water.

3. The method of claim 2 wherein the particles are preheated before impregnation to a temperature of about 110 degrees C. and then impregnated with the hydrotropic solvent.

4. The method of claim 2 wherein the particles are subjected after impregnation to a mechanical rubbing to separate the fibers and then digested in the hydrotropic solvent.

5. The method of claim 2 wherein the particles after digestion in the hydrotropic solvent are mechanically squeezed to remove the imbibed hydrotropic solvent therefrom until the remaining fiber liquid mass contains no more than 10% by weight of the hydrotropic solvent.

6. The method of claim 2 wherein the hydrotropic solvent-wash liquid drained from the fiber-liquid is separated by weight separation into a hydrotropic solvent component and a sulfur containing pulping liquor component.

7. A method of pulping lignin containing natural cellulosic materials such as wood particles which comprises:
   subjecting such particles which are substantially free of imbibed moisture to impregnation and digestion in a substantially saturated solution of sodium xylene sulfonate in water thereby dissolving lignin in said solution;
   mechanically extracting the liquid solution until the solution remaining with the particles is less than 20% of the mass;
   reacting the mass with a sulfite containing pulping liquor thereby forming ligno-sulfonic compounds that are soluble in the liquor;
   draining off the resulting liquid from the particle mass;
   washing the particle mass with a quantity of substantially saturated solution of sodium xylene sulfonate to remove the remaining sulfite containing liquor; and
   washing the particle mass with water to remove the sodium xylene sulfonate.

8. The method of claim 7 wherein the particles are subjected to mechanical rubbing after initial impregnation but before completion of the digestion in the sodium xylene sulfonate solution.

9. The method of claim 7 wherein the particles are at a temperature of the order of 110 degrees C. when first contacted with the sodium xylene sulfonate solution.

10. The method of claim 7 wherein the sodium xylene sulfonate and pulping liquor mixture recovered from the particle mass is subjected to a gravity separation and the sodium xylene sulfonate recovered from the separation is thereafter diluted with water to precipitate any free lignin therein.

11. The method of claim 7 wherein the sulfite containing liquor is sodium bisulfite solution in water.

12. In a method of pulping lignin containing natural cellulosic materials wherein the lignin is partially removed by impregnating and digesting the particles with a hydrotropic solvent followed by reacting remaining lignin therein with a pulping liquor comprising one of the group of sulfite and sulphide pulping liquors and capable of reacting with the lignin to form water soluble ligno-sulfonic compounds, the steps of:

removing the free pulping liquor;

washing the remaining mass of pulp with an additional amount of the hydrotropic solvent to remove the remainder of the pulping liquor;

washing the hydrotropic solvent from the pulp with wash water; and precipitating lignin from the hydrotropic solvent first used to impregnate and digest the cellulosic material by diluting the said solvent with the used wash water.

13. The method of claim 12 wherein the hydrotropic solvent is recovered from the solvent-pulping liquor mixture by specific gravity separation.

14. The method of removing lignin from lignin containing particles of natural cellulosic materials which comprises:

first drying and heating the particles to remove imbibed moisture;

then impregnating and soaking the particles while hot in a concentrated hydrotropic solvent and draining and squeezing the solution from the particles;

then digesting the particles in a sodium bisulfite containing pulping liquor; and removing the pulping liquor from the resulting pulp.

References Cited by the Examiner

UNITED STATES PATENTS

| | | | |
|---|---|---|---|
| 2,106,797 | 2/1938 | Dreyfus | 162—76 X |
| 2,308,564 | 1/1943 | McKee | 162—76 X |
| 2,668,761 | 2/1954 | Bate | 162—76 X |

DONALL H. SYLVESTER, *Primary Examiner.*

HOWARD R. CAINE, *Examiner.*